United States Patent [19]
Belk et al.

[11] 3,907,673
[45] Sept. 23, 1975

[54] TREATING WASTE

[75] Inventors: Thomas E. Belk, Bowie, Md.;
Stephen S. Blecharczyk, Kingston;
Edward L. Shunney, Warwick, both
of R.I.

[73] Assignee: Fram Corporation, East Providence, R.I.

[22] Filed: Dec. 28, 1971

[21] Appl. No.: 213,104

Related U.S. Application Data

[63] Continuation-in-part of Ser. No. 876,842, Nov. 14, 1969, abandoned.

[52] U.S. Cl. .............. 210/17; 210/34; 210/40; 210/108; 210/128; 210/195
[51] Int. Cl. ............... C02c 1/04; C02b 1/14
[58] Field of Search ............. 210/3-8, 15, 210/18, 27, 34, 39, 40, 80, 108, 293, 259, 274, 283, 195, 128, 129, 20, 17, 30

[56] References Cited
UNITED STATES PATENTS

| | | | |
|---|---|---|---|
| 622,423 | 4/1899 | Greig | 210/283 X |
| 2,748,077 | 5/1956 | Hodan et al. | 210/27 |
| 3,337,454 | 8/1967 | Gruenwald | 210/80 X |
| 3,342,334 | 9/1967 | Soriente et al. | 210/108 |
| 3,442,798 | 5/1969 | Schoeffel et al. | 210/40 |
| 3,472,764 | 10/1969 | Culp et al. | 210/108 X |
| 3,803,029 | 4/1974 | Blecharczyk | 210/40 X |

OTHER PUBLICATIONS

Rudolfs et al., "Activated Carbon in Sewage Treatment," *Sewage Works Journal*, Vol. 7, Sept., 1935, pp. 852, 863, 880.

*Primary Examiner*—Thomas G. Wyse

[57] ABSTRACT

Treating waste with a system featuring a receiver tank having an inlet for receipt of waste into the system, means for connecting the receiver tank inlet to a source of the waste, at least one treatment tank connected downstream of the receiver tank for mechanical filtration of solid contaminants and adsorption of liquid contaminants contained in the waste. The treatment tank having a packed bed of adsorbent particles and means to aerate and fluidize the bed.

3 Claims, 4 Drawing Figures

TREATING WASTE

REFERENCE TO RELATED APPLICATION

This application is a continuation-in-part of U.S. Pat. application Ser. No. 876,842, filed Nov. 14, 1969, now abandoned.

BACKGROUND OF THE INVENTION

This invention relates to waste disposal.

A primary object of the invention is to provide for effective treatment of waste produced in small quantities (e.g., on a marine vessel), with apparatus that is self-contained, compact, lightweight (e.g., easily installed and carried on a ship), and inexpensive. Other objects are to provide such a system in which orientation is not critical (e.g., which is insensitive to the roll of a ship), and which, by its modular nature, provides flexibility of installed configuration.

SUMMARY OF THE INVENTION

In general the invention features a waste treatment system comprising a receiver tank having an inlet for receipt of waste into the system, means for connecting the receiver tank inlet to a source of the waste, at least one treatment tank connected downstream of the receiver tank for mechanical filtration of solid contaminants and adsorption of liquid contaminants contained in the waste, the treatment tank having a packed bed of adsorbent particles, means to aerate and fluidize the bed of the treatment tank, the means including an aeration inlet below the bed, the tank having a liquid outlet, a recirculation line connected from the liquid outlet to upstream of the treatment tank, valves connected for control of flow in the system during a treatment cycle in which waste flows from the receiver tank through the treatment tank, an aeration and fluidization cycle in which air flows through the inlet of the treatment tank to fluidize and biologically regenerate the adsorbent particles therein, and a recirculation cycle in which waste flows through the recirculation line and down through the treatment tank in the opposite direction as the air flow during the aeration and fluidization cycle to reestablish the bed therein and discharge loosened solids therefrom, means including a first liquid level probe in the receiver tank operative to automatically initiate the aeration and fluidization cycle when the receiver tank contents are at a first level, means including a second liquid level probe in the receiver tank operative to automatically initiate the treatment cycle when the receiver tank contents are at a second level above the first level, and means including a third liquid level probe in the receiver tank operative to automatically initiate the recirculation cycle immediately following the aeration and fluidization cycle when the receiver tank contents are at a level intermediate the first and second levels, the system being constructed and arranged so that waste flows into the receiver tank during the aeration and fluidization cycle, whereby during the recirculation cycle loosened solids are discharged from the treatment tank and the bed therein is reestablished. In preferred embodiments there are two treatment tanks connected in series, the recirculation line being connected from the liquid outlet from the liquid outlet from the most downstream of the tanks to upstream of the two treatment tanks.

Other objects, features, and advantages will appear from the following description of a preferred embodiment taken with the attached drawings thereof, in which:

DESCRIPTION OF THE PREFERRED EMBODIMENT

Figure 1:
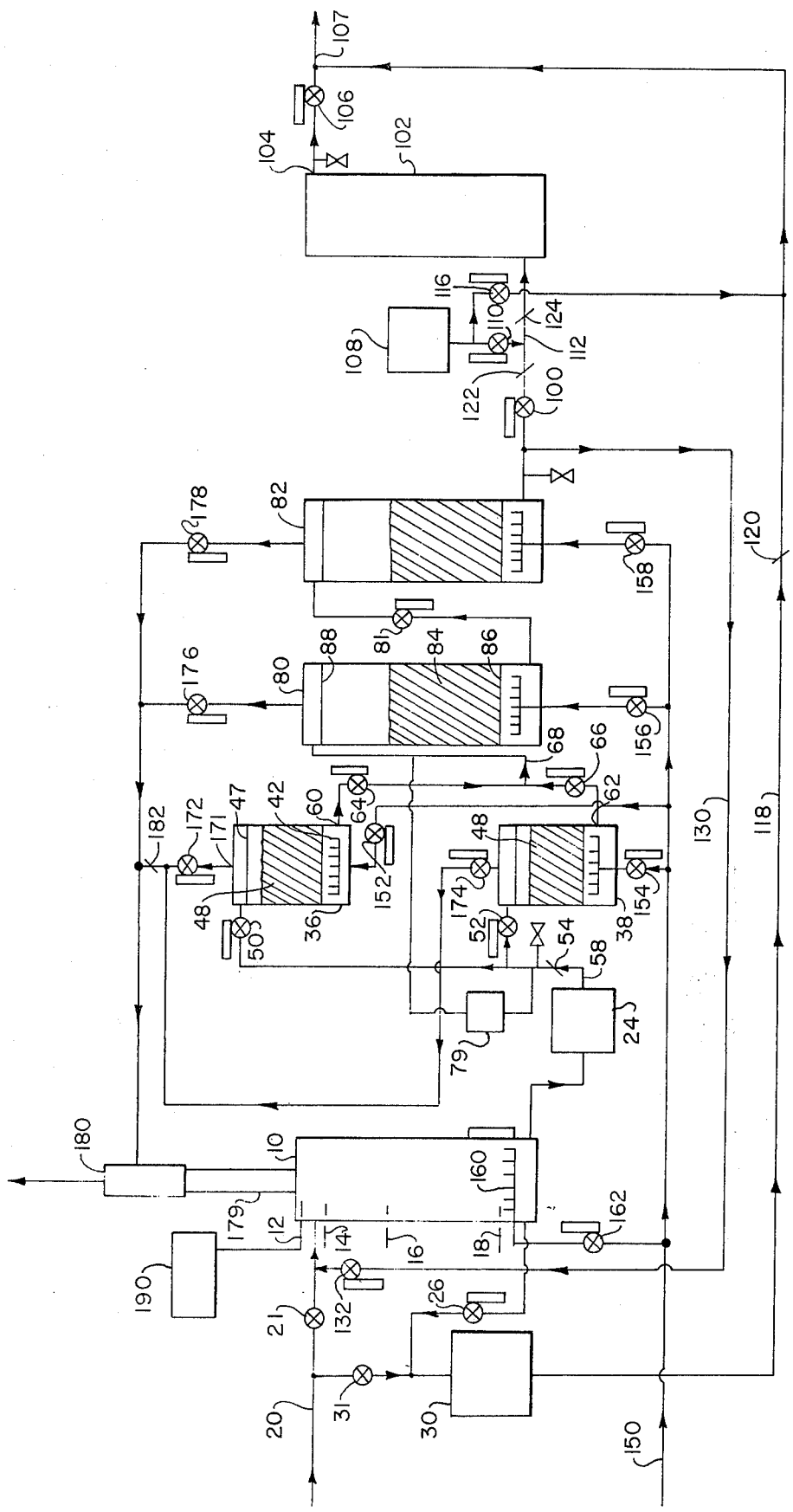
FIG. 1 is a schematic representation of the waste disposal system.

Referring to FIG. 1, receiver tank 10, with liquid level probes 12, 14, 16, and 18, is connected near its top to sewage input line 20 in which is provided valve 21; and near its bottom to main pump 24 and, through valve 26, to bypass pump 30. Sewage input is additionally provided directly to pump 30 through valve 31.

Figure 2:
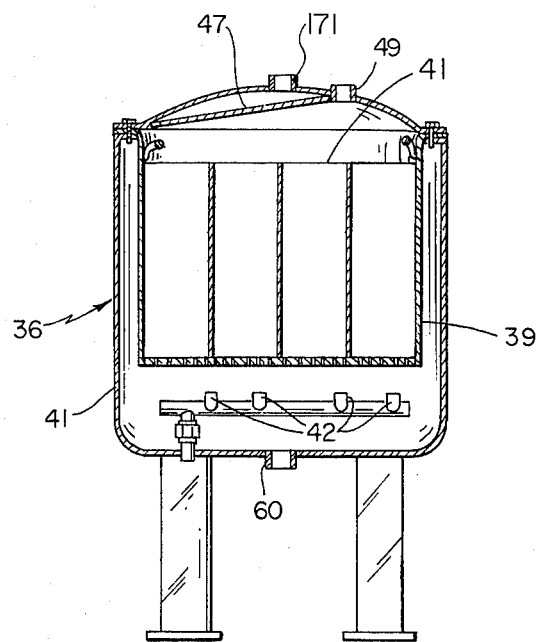
FIG. 2 is a sectional view of a filter tank.
Figure 3:
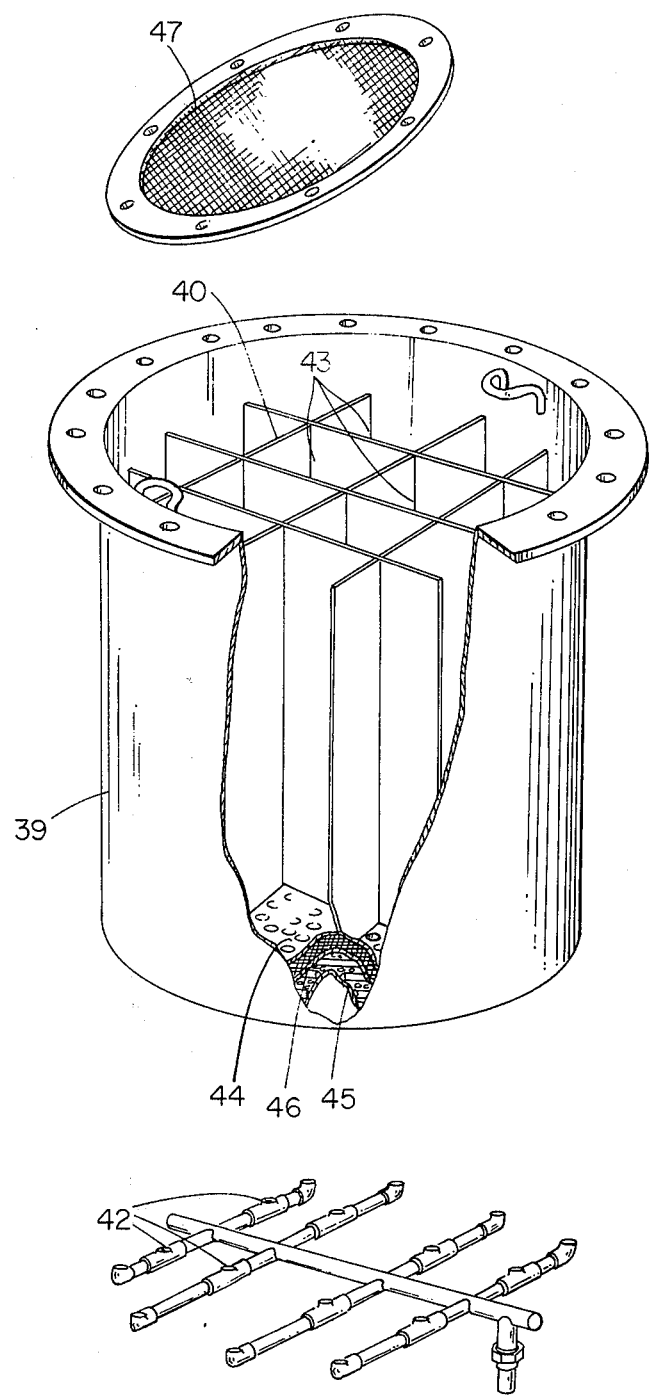
FIG. 3 is an exploded view of the screen, the basket, partly broken away to show the partition, and the air manifold of a filter tank.

Filter tanks 36 and 38 each consist of a basket 39 (FIGS. 2, 3), with egg crate partitions 40, supported in a tank 41 above air nozzles 42 (one nozzle for each basket cell 43). The bottom of basket 39 comprises a perforated screen 44 which retains the carbon in the basket, and a back-up plate 45, ribbed to provide added mechanical support to screen 44, separated by a mesh screen 46. A perforated screen 47 partially closes the top of basket 39, and retains the carbon in the basket.

Each basket 39 is partially filled with a bed of activated carbon 48 (FIG. 1), partitions 40 helping to maintain uniform carbon depth (here 10 inches, the preferred range being dependent upon the volume of waste being treated).

The output end of pump 24 is connected through valve 50 to inlet 49 (FIG. 2) of tank 36 above the basket, and through valve 52 similarly to tank 38. Check valve 54 is provided in line 58 upstream of valves 50 and 52. Outlets 60 and 62, below the baskets in tanks 36 and 38, respectively, are connected through respective valves 64 and 66 to line 68. Pressure differential operated diaphragm switch 79 is connected between lines 58 and 68.

Figure 4:
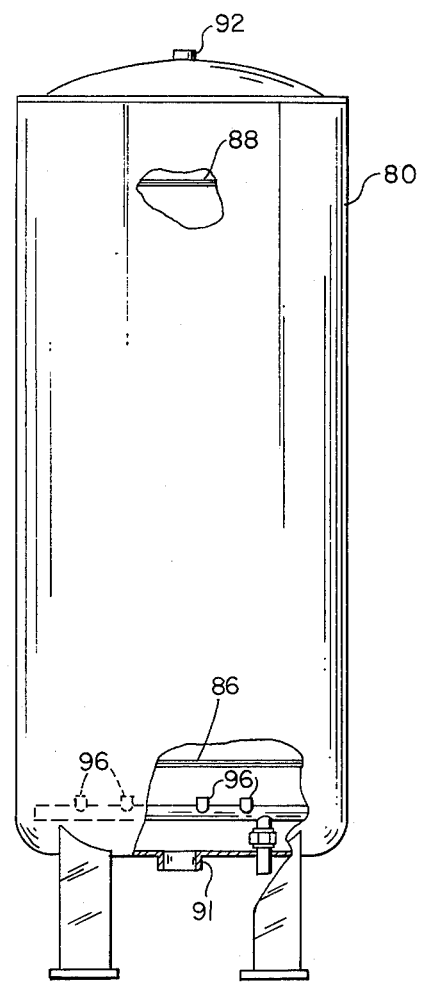
FIG. 4 is an elevational view, partly broken away, of an adsorption tank.

Line 68 leads to the inlet of adsorption tank 80, connected in series through valve 81 with an identical tank 82. Each adsorption tank has a bed 84 of activated carbon partially filling the space between a pair of screen units 86 and 88 (FIG. 4). Screen units 86 and 88 each have a perforated screen, a mesh screen, and a back-up plate, as described for basket 39. Inlet 92 and outlet 94 are respectively above and below the bed. Air nozzles 96 are below screen 86.

The outlet of tank 82 is connected through valve 100 to the bottom of contact tank 102, top outlet 104 of which provides treated effluent through valve 106 for disposal through effluent line 107.

Chlorinator 108 is connected through valve 110 to line 112 between valve 100 and tank 102, and through valve 116 to emergency bypass line 118 running from the outlet end of pump 30 to effluent line 107.

Check valve 120 is provided in bypass line 118, and check valves 122 and 124 are provided in line 112 respectively upstream and downstream of the chlorinator connection.

Recirculation line 130 runs from the outlet of tank 82 through valve 132 to input line 20 downstream of valve 21.

Air inlet line 150 (connected to a source of air, not shown) is connected to the air nozzles in columns 36, 38, 80, and 82 through valves 152, 154, 156, and 158 respectively, and to air nozzles 160 at the bottom of tank 10 through valve 162. Air and other gaseous effluent leave the filtering and adsorption tanks at their tops (e.g., through outlet 171 of tank 36, FIG. 2) through valves 172, 174, 176, and 178, respectively and leave tank 10 through line 179, all through liquid trap 180. Gaseous flow from tanks 36 and 38 passes through check valve 182.

Alarm 190 is connected to probe 12.

All valves not otherwise specified are pneumatically actuated ball type, and suitable control circuitry (not shown) is provided for their operation.

In operation, with the systems installed, e.g., on board a ship to receive human and galley wastes, the treatment mode will be initiated whenever the liquid level in the receiver tank is between probes 12 and 14. In that mode, valves 21, 50 or 52, 64 or 66, 81, 100, 110, and 106 are open. Waste will flow from the receiver tank through one of filter tanks 36 and 38, for mechanical removal of solids. The carbon in the filter tank will additionally provide some adsorption, e.g, of disinfectant which may have been added to the waste. The accumulation of solids in the filter tanks will increase the pressure drop sensed by switch 79, and, when that sensed pressure drop reflects the maximum desired solids loading of the tank in use, switch 79 will reverse the positions of valves 50, 52, 64, and 66 so that the other tank will begin to receive waste. Whichever filter tank does not receive waste has its air valves 152 or 154, and 172 or 174 open, so that air will flow upwardly through that tank. Such aeration causes biological oxidation of the organic wastes collected in the column, with resultant conversion of the solids into gaseous effluent, thereby effectively regenerating the carbon for subsequent filtration of additional solids (biological regeneration being described in U.S. Pat. application Ser. No. 864,852 filed Oct. 8, 1969, now U.S. Pat. No. 3,803,029, the disclosure of which is incorporated by reference herein).

Liquid waste leaving the filter tank (carrying, of course, such residual solids as have not been filtered out) flows through adsorption tanks 80 and 82 in series. Some additional mechanical solids filtration occurs, but tanks 80 and 82 function primarily to adsorb soluable components.

Effluent from tank 82 is chlorinated as it flows through line 112 into tank 104 and is discharged overboard through line 107.

In the treatment cycle air valves 162, 156, 158, 176, 178, and liquid valves 132, 31, 26, and 116 are closed.

Normally, the contents of tank 10 will be depleted during the treatment cycle. When the liquid level drops to probe 18, the system automatically switches to the aeration cycle. Valves 110, 106, 100, 50 or 52 (whichever is open), and 64 or 66, and 81 are closed. All air valves are opened, so that air flows upwardly through tank 10 both filter tanks and both adsorption tanks, and out through trap 180. Biological oxidation of filtered solids and adsorbed liquids occurs in all filter and adsorption tanks, restoring the capacity of the carbon. The upward flow of air fluidizes and loosens the carbon beds in tanks 80 and 82, tending to free solids present there for subsequent discharge.

Waste input continues to enter tank 10 during the aeration cycle. When the liquid level reaches probe 16 the system automatically switches to the recirculation cycle. All valves are positioned as in the treatment cycle, except that valves 100 and 110 are closed, and valve 132 is opened, so that effluent from tank 82 is recirculated through line 130 to tank 10. During recirculation, solids are discharged from the loosened bed in tank 82, and the downward flow of liquid repacks the beds in tanks 80 and 82.

When the level in tank again reaches probe 14 the system re-enters the treatment cycle.

In the event the level in tank 10 should ever reach probe 12, alarm 190 will sound, valves 26 and 116 will open so that the macerated waste in the receiver tank will be pumped through line 118 for chlorination and discharge through line 107. In this emergency bypass cycle, other liquid valves are closed.

In all cycles the system is not disturbed by roll of the ship, since, e.g., there are no settling tanks.

The modular nature of the system allows the number of tanks to be chosen on the basis of the required capacity and degree of treatment desired, and allows flexibility in the installed configuration.

While activated carbon is the preferred adsorbent of the invention, those skilled in the art will appreciate that other adsorbent materials having similar characteristics of high porosity and large internal surface area can be employed. Typical examples are macroreticular polymer resin and silica gel.

Other embodiments will occur to those skilled in the art and are within the following claims.

What is claimed is:

1. A waste treatment system comprising
a receiver tank having an inlet for receipt of waste into said system, and an outlet
means for connecting said receiver tank inlet to a source of said waste,
at least one treatment tank having an inlet connected to said receiver tank outlet for mechanical filtration of solid contaminants and adsorption of liquid contaminants contained in said waste,
said treatment tank having a packed bed of adsorbent particles,
means to aerate and fluidize said bed of said treatment tank, said means including an aeration inlet below said bed, said tank having a liquid outlet,
a recirculation line connected from said treatment tank liquid outlet to upstream of said treatment tank,
means for control of flow in said system during a treatment cycle in which waste flows from said receiver tank through said treatment tank, an aeration and fluidization cycle in which air flows through said inlet of said treatment tank to fluidize and biologically regenerate said adsorbent particles therein, and a recirculation cycle in which waste flows through said recirculation line and down through said treatment tank in the opposite direction as the air flow during said aeration and fluidization cycle to reestablish said bed therein and discharge loosened solids therefrom,
means including a first liquid probe in said receiver tank operative to automatically initiate said aeration and fluidization cycle when the receiver tank contents are at a first level, means including a second liquid level probe in said receiver tank operative to automatically initiate said treatment cycle when said receiver tank contents are at a second level above said first level, and means including a third liquid level probe in said receiver tank operative to automatically initiate said recirculation cycle immediately following said aeration and fluidization cycle when said receiver tank contents are at a level intermediate said first and second levels, said system being constructed and arranged so that waste flows into said receiver tank during said aeration and fluidization cycle, whereby during said recirculation cycle loosened solids are discharged from said treatment tank and the bed therein is reestablished.

2. The system of claim 1 comprising at least two treatment tanks connected in series, said recirculation line being connected from said liquid outlet of the most downstream of said tanks to upstream of said two treatment tanks.

3. A method of treating waste comprising the steps of accumulating waste in a receiver tank having an outlet, providing downstream of said receiver tank at least one treatment tank having an inlet connected to said receiver tank outlet and a packed bed of adsorbent particles for mechanical filtration of solid contaminants and adsorption of liquid contaminants contained in said waste, and controlling the flow of waste and air in said system to provide a treatment cycle in which waste flows from said receiver tank through said treatment tank, an aeration and fluidization cycle in which air flows upwardly through said treatment tank to fluidize and biologically regenerate said adsorbent particles therein, and a recirculation cycle in which waste flows from the outlet of said treatment tank to upstream of said receiver tank and down through said treatment tank in the opposite direction as the air flows during said aeration and fluidization cycle to reestablish said bed and discharge loosened solids therefrom, automatically initiating said aeration and fluidization cycle when the receiver tank contents are at a first level, automatically initiating said treatment cycle when said receiver tank contents are at a second level above said first level, and automatically initiating said recirculation cycle immediately following said aeration and fluidization cycle when said receiver tank contents are at a level intermediate said first and second levels, whereby waste flows into said receiver tank during said aeration and fluidization cycle, whereby during said recirculation cycle loosened solids are discharged from said treatment tank and the bed therein is reestablished.

* * * * *